A. P. McKAY.
DISK PLOW AND SUBSOILER.
APPLICATION FILED SEPT. 15, 1920.
1,397,434.
Patented Nov. 15, 1921.
7 SHEETS—SHEET 6.
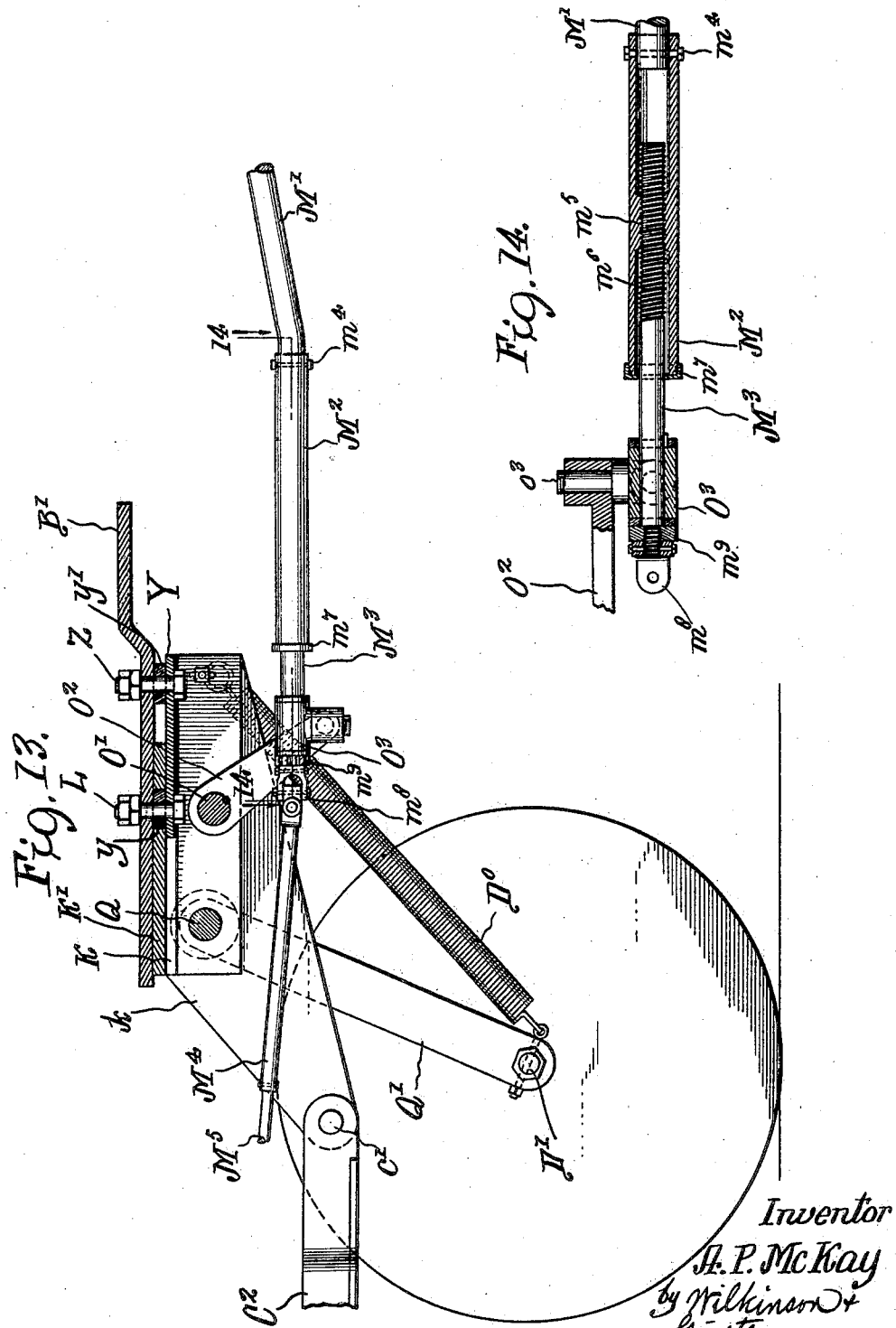

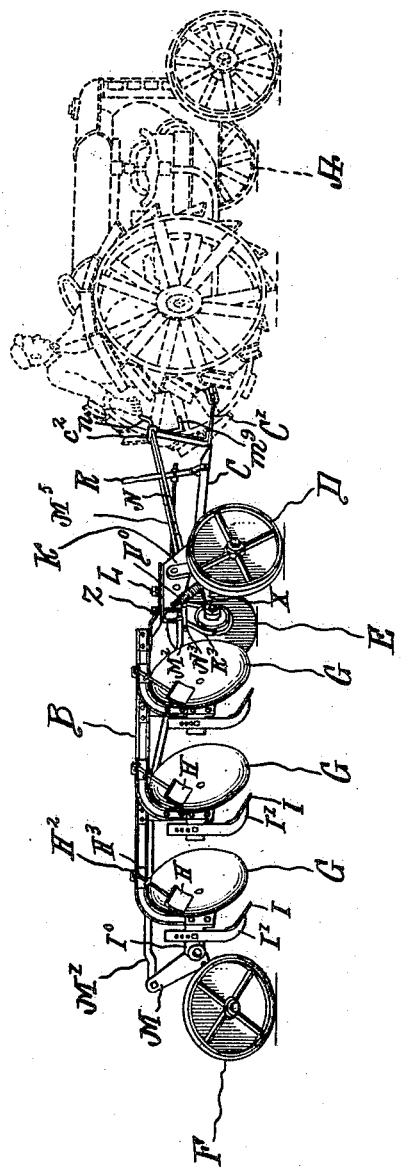

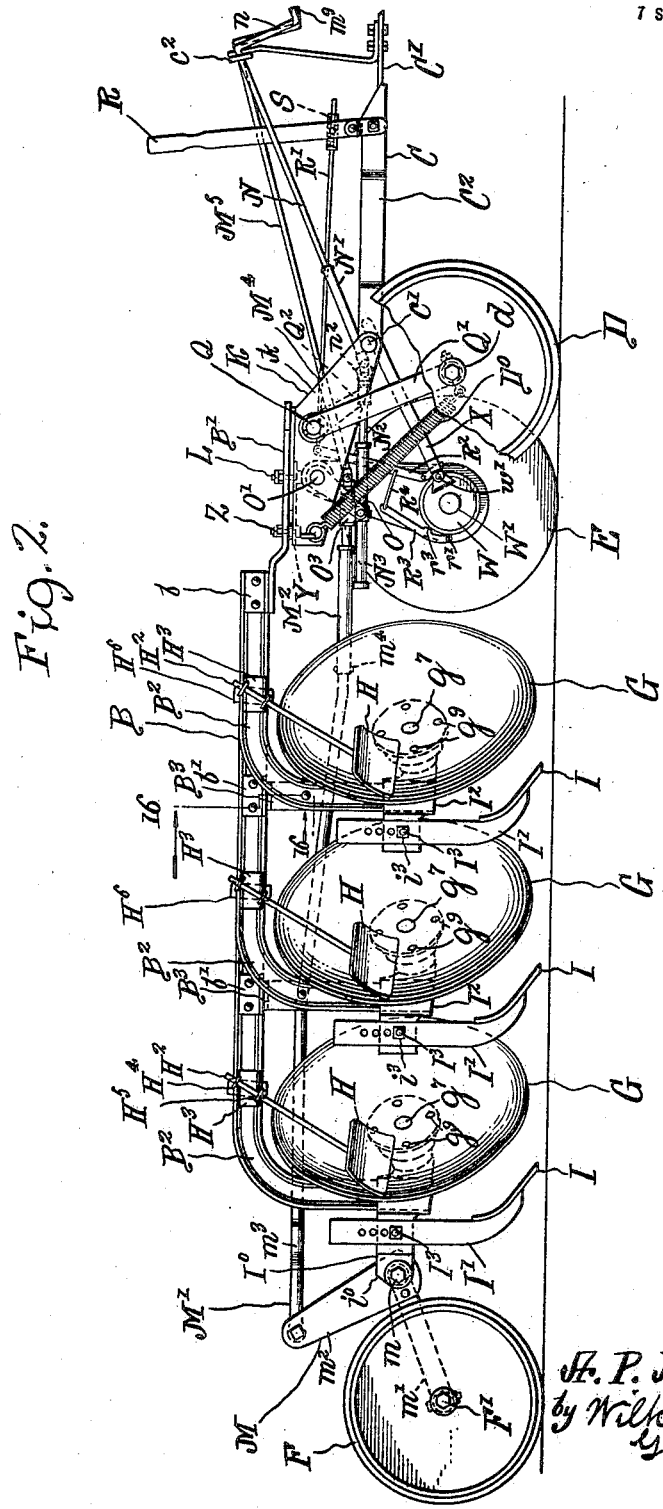

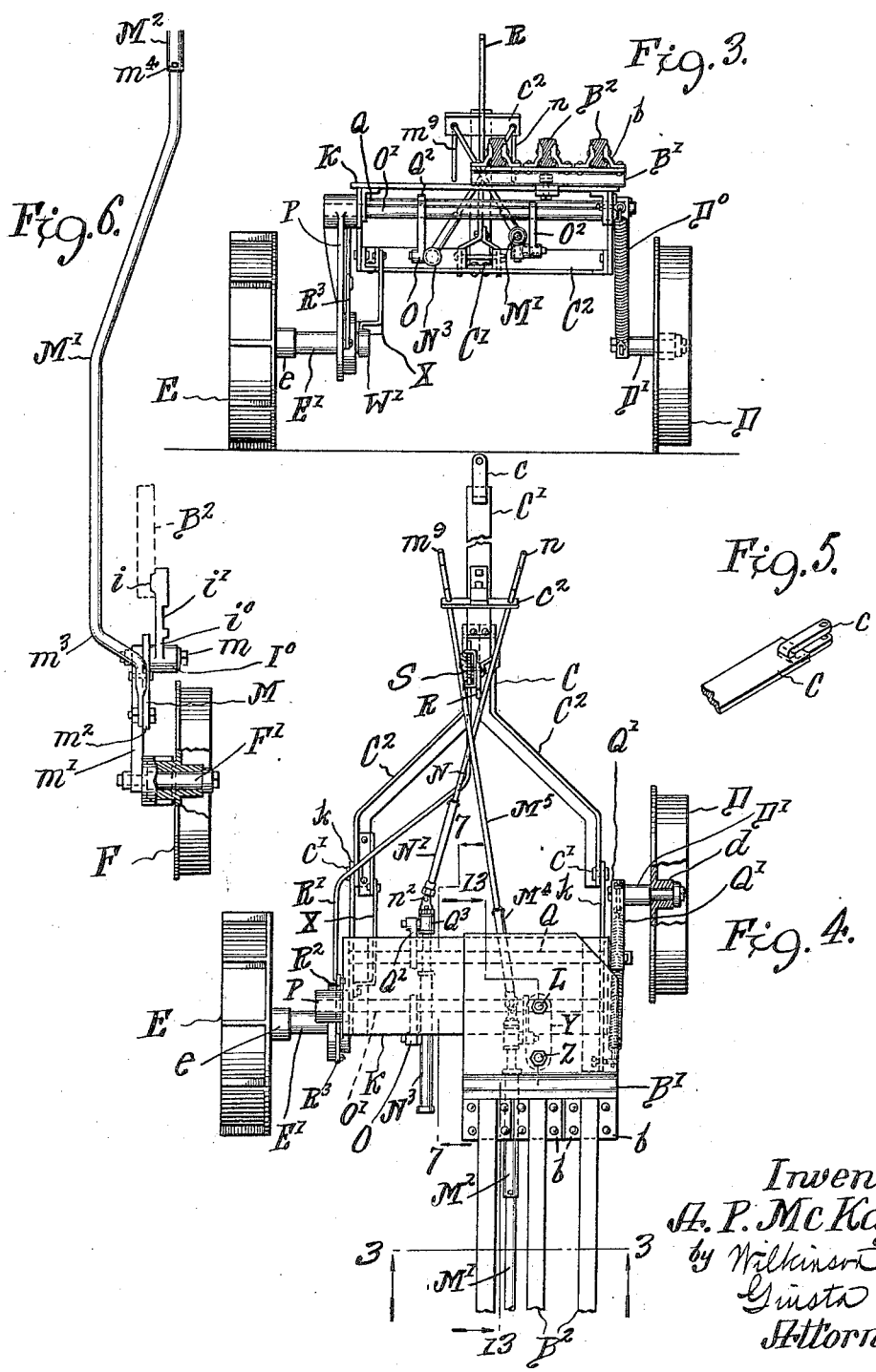

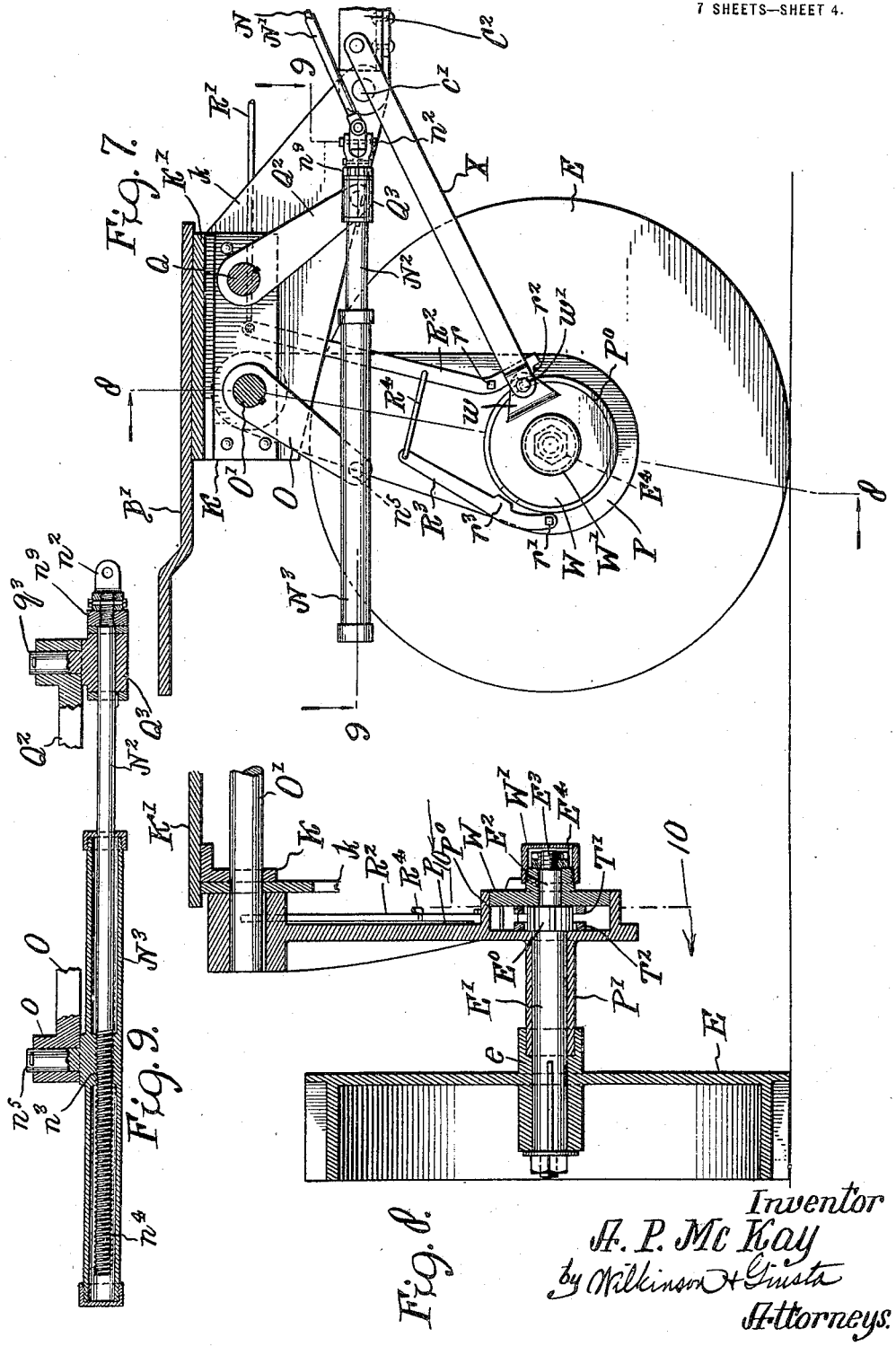

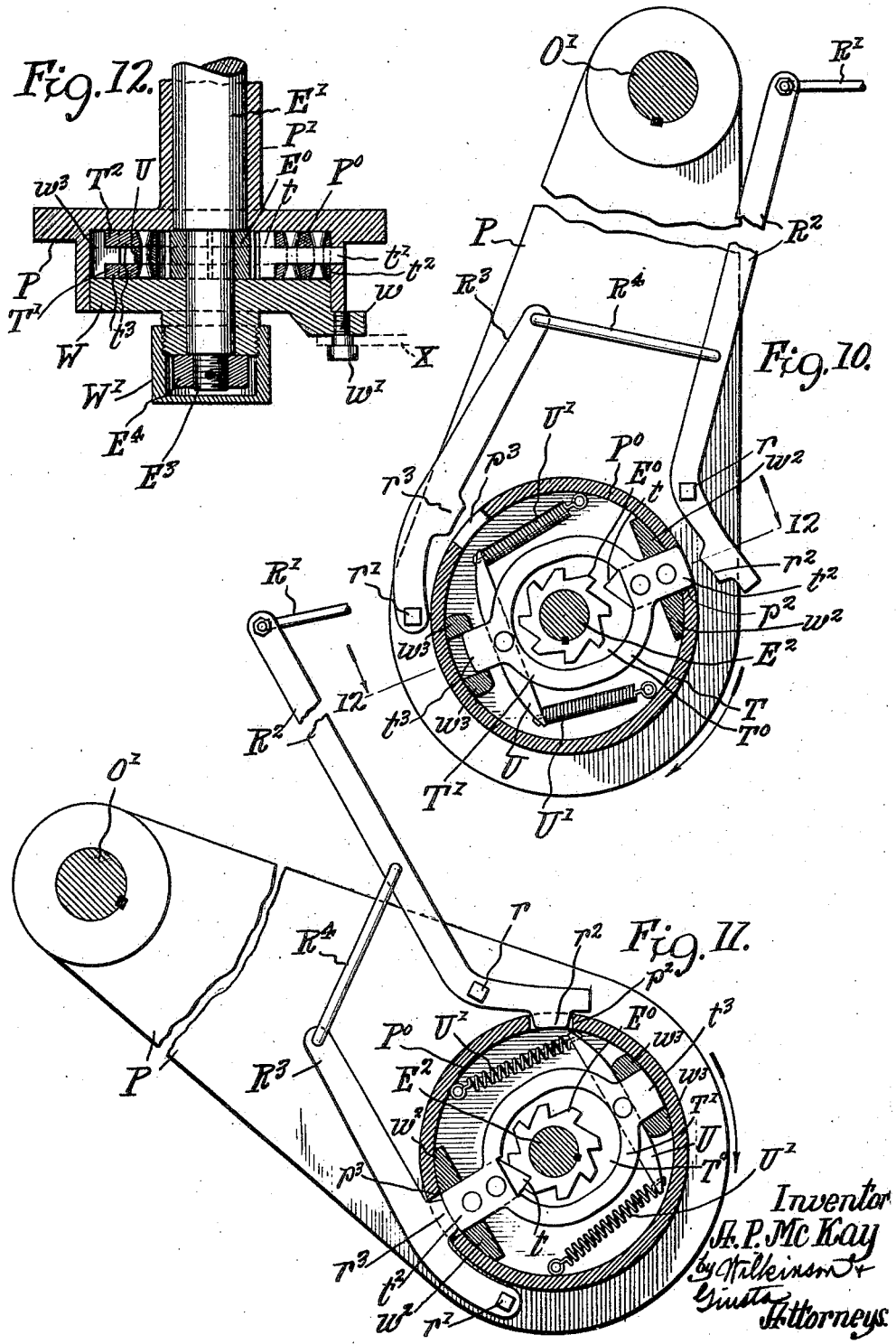

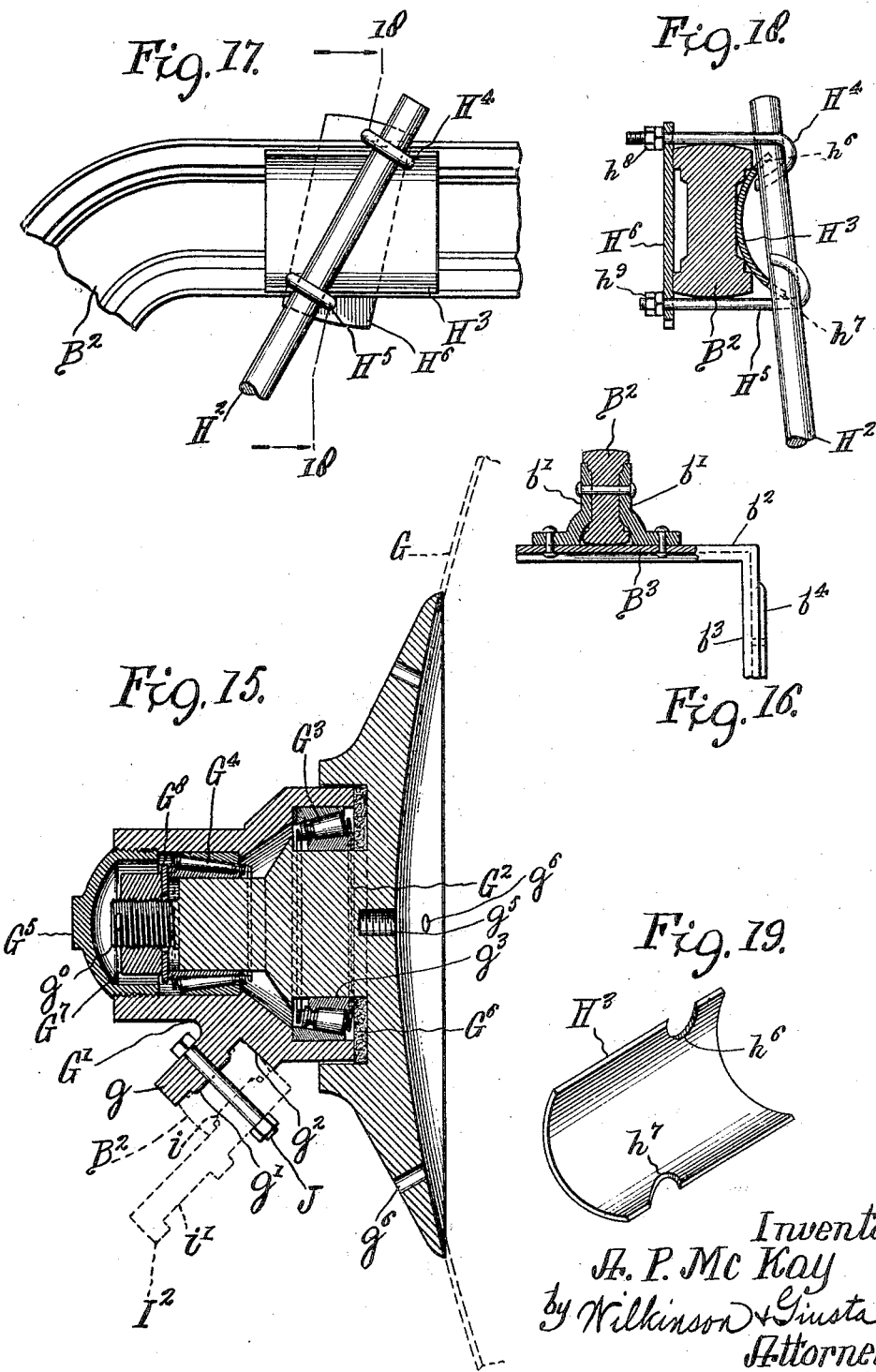

UNITED STATES PATENT OFFICE.

AUGUSTA POSTELLE McKAY, OF ROME, GEORGIA, ASSIGNOR TO McKAY DISK PLOW CO., OF ROME, GEORGIA, A CORPORATION OF GEORGIA.

DISK PLOW AND SUBSOILER.

1,397,434.      Specification of Letters Patent.      Patented Nov. 15, 1921.

Application filed September 15, 1920. Serial No. 410,563.

*To all whom it may concern:*

Be it known that I, AUGUSTA POSTELLE McKAY, a citizen of the United States, residing at Rome, in the county of Floyd and State of Georgia, have invented certain new and useful Improvements in Disk Plows and Subsoilers; and I do hereby declare the following to be a full, clear, and exact description of the invention, such as will enable others skilled in the art to which it appertains to make and use the same.

My present invention relates to an arrangement of disks and subsoilers intended to be used as an attachment for tractors, and one of the special features of the invention is that the plow and subsoiler attachment may be controlled by a single operator who rides upon the tractor, and who can perform all the operations of coupling the attachment onto, or uncoupling it from, the tractor, transporting the attachment from place to place by means of the tractor, and operating the attachment in the field either for the ordinary plowing or for controlling the parts when meeting obstructions, all without requiring the single operator to move from his seat on the tractor.

The invention also relates to certain improvements in means whereby the disks and subsoilers may be elevated and lowered, both at the front and rear ends, in order to raise the plows and subsoilers out of contact with the soil, or to quickly raise same when an obstruction is encountered, or to allow the same to descend into the operative position.

The invention further relates to means for controlling the automatic lift, and to various other details in construction and operation which will be hereinafter more fully described.

My present invention is intended especially to provide certain improvements over the apparatus shown in my earlier Patents, No. 1,189,982, granted July 4, 1916, and entitled Improvements in disk plows, and No. 1,323,887, granted December 2, 1919, and entitled Improvements in disk plows and subsoilers.

My invention will be more fully understood after reference to the accompanying drawings, in which like parts are indicated by similar reference symbols throughout the several views, and in which:—

Figure 1 is a perspective view of the attachment connected to a tractor, the tractor and the operator for the same being indicated in dotted lines.

Fig. 2 is a view, on a larger scale, of the disk plow and subsoiler attachment as disconnected from the tractor, parts being broken away.

Fig. 3 is a rear view of the road and furrow wheels, with the frame supported thereby, the frame being shown partly in section along the line 3—3 of Fig. 4, and looking in the direction of the arrows.

Fig. 4 is a plan view of the parts shown in Fig. 3.

Fig. 5 is a detail showing the coupling yoke for attaching the disk plow and subsoiler attachment to the tractor.

Fig. 6 is a detail showing in plan the rear wheel and the pitman for operating the same, parts being broken away.

Fig. 7 is a sectional elevation, on a larger scale, along the line 7—7 of Fig. 4, and looking in the direction of the arrows.

Fig. 8 shows a section along the line 8—8 of Fig. 7, and looking in the direction of the arrows, parts being shown in elevation.

Fig. 9 shows a section along the broken line 9—9 of Fig. 7, and looking in the direction of the arrows.

Fig. 10 shows a section along the broken line 10—10 of Fig. 8, but on a larger scale, and shows the parts in the position assumed when the main frame is in the raised position as indicated in Figs. 2 and 7.

Fig. 11 is a similar view to Fig. 10, but shows the parts in the position assumed when the main frame is lowered, and the disk plows and subsoilers are in the operative position.

Fig. 12 shows a section along the line 12—12 of Fig. 10, and looking in the direction of the arrows.

Fig. 13 shows a section taken along the line 13—13 of Fig. 4, and looking in the direction of the arrows, the parts being shown on a larger scale than in Fig. 4.

Fig. 14 shows a section along the line 14—14 of Fig. 13, and looking in the direction of the arrows.

Fig. 15 shows a central horizontal section through the bearing for one of the disk plows, the detachable plate of the disk plow being shown in dotted lines, and parts of the main frame being also indicated in dotted lines.

Fig. 16 shows a section through one of the plow beams and angle braces along the line 16—16 of Fig. 2, and looking in the direction of the arrows.

Fig. 17 shows a side elevation of a portion of one of the plow beams and the rods supporting the scraper, and illustrates the mode of attaching the scraper to the plow beam.

Fig. 18 shows a section along the broken line 18—18 of Fig. 17, and looking in the direction of the arrows, and Fig. 19 is a detail showing a perspective view of one of the resilient arcuate plates used in setting the scraper rod at the proper angle.

A represents the tractor, and B represents the main frame of the attachment which is connected to the tractor by the draft arrangement C. The complete attachment is supported on three wheels, the front of furrow wheel D, the road wheel E and the rear wheel F. The main frame carries the disk plows G, the scrapers H and the subsoilers I. The wheels D and E support a truck frame K swiveled to the main frame by means of the king bolt L.

The draft attachment C comprises the tongue C' with a fastening device preferably in the form of a U-shaped link $c$ which may be attached to the tractor with a coupling pin, or in any other convenient way. This tongue C' terminates in a yoke C², which is hinged at $c'$ to the downwardly and forwardly projecting plates $k$ of the truck frame K.

The forward part of the main frame B is provided with a bearing plate B' which rests upon the upper portion of the truck frame K which is swiveled on the king bolt L, as will be hereinafter more fully described.

The plow beams B² are attached to this plate B' as by means of the angle irons $b$ and bolts, as shown most clearly in Figs. 2 and 3. The plow beams are preferably I-shaped in cross section, and their heels are curved and bent downwardly, as shown most clearly in Figs. 1 and 2.

In order to stiffen the main frame, braces B³ are provided, shown most clearly in Figs. 2 and 16, which braces are connected to one plow beam B², as shown in Fig. 16, as by means of the angle irons or fish plates $b'$ and corresponding bolts, and these braces project laterally, as at $b^2$, and downwardly, as at $b^3$, and are provided with ribs $b^4$ adapted to fit into the corresponding groove in the side of the opposite plow beam, and the parts are then bolted together to form a rigid structure. To the heels of the plow beams the brackets G' for the disks are attached, as shown most clearly in Figs. 2 and 15. Each bracket is provided with laterally projecting arms $h$ having ribs $g'$ adapted to fit snugly into the groove in the corresponding plow beam, as indicated in Fig. 15, and each bracket is also provided with a bearing face $g^2$ adapted to engage the front edge of the plow beam to which it is attached by one or more bolts J. A single bolt would ordinarily be sufficient for each bracket G'.

Each bracket G' is provided with a central chamber into which projects the stem of the journal block G² to which the disk G is attached. This block is provided with cylindrical surfaces $g^3$ for the roller bearings G³ and G⁴, and the outer end is screw-threaded as at $g^0$ to engage the nut G⁷, which engages the bearing ring G⁸ and holds the block in place in its bearings.

The outer end of the opening in the bracket G' is closed by the screw plug G⁵, and the inner edge of the said bracket bears against the packing G⁶, thus forming a closed chamber which may be supplied freely with oil if desired.

The outer face of the bearing block G² is curved as shown in Fig. 15, and is provided with the screw socket $g^5$, to engage the central screw bolt $g^7$ of the disk, and with bolt holes $g^6$ to engage the bolts $g^9$ of the disk, as shown in Figs. 2 and 15. This particular arrangement provides a rigid connection between the disk bracket and the plow beam, and a strong and durable anti-friction bearing is provided for the rotary disks. The disks G may be applied to or removed from the block G² while the other parts are still in place; or if desired the cap G⁵ may be removed and the nut G⁷ unscrewed, and the block G², with the disk attached, may be removed from the apparatus.

The scrapers H are preferably of substantially the form shown in Figs. 1 and 2 and are shaped to fit the concave face of the corresponding disk.

The construction of the scraper *per se*, not being a part of my present invention, will not be described in detail herein.

In order to secure the horizontal adjustment of the scraper I provide the adjustable attaching means for the scraper rod or handle shown in detail in Figs. 17, 18 and 19, in which H³ represents an arcuate plate made of resilient material, such as steel, having diagonally disposed notches $h^6$ and $h^7$ therein, as shown more clearly in Fig. 19, into which notches the scraper rod H² engages, as shown in Fig. 18. The opposite side of the scraper rod is engaged by the hook bolts H⁴ and H⁵, see Figs. 17 and 18, and the free ends of these hook bolts pass through the plate H⁶ and are screw threaded to engage the nuts $h^8$ and $h^9$, respectively. This plate $H^6$ is on one side of the corresponding plow beam $B^2$, while the arcuate plate $H^3$ is on the opposite side of the plow beam, and by adjusting the position of the plate $H^3$ and setting up on the nuts $h^8$ and $h^9$ the angle of the rod $H^2$ with the horizontal may be adjusted to the desired position.

The arcuate plate $H^3$ will give a yielding but secure support to the upper end of the scraper rod and will hold it fast against the forces tending to twist it in the horizontal plane.

It will be seen that by loosening up on either of the hooks $H^4$ or $H^5$ the plate $H^3$ may be shifted so that the scraper may be readily adjusted to the desired position relative to the plow disk.

The subsoilers I carry standards $I'$ which are perforated as shown in Figs. 2 and 15. Each standard fits in a groove $i'$ in a block $I^2$, which has a rib $i$ adapted to fit snugly in the groove in the face of the plow beam, as shown most clearly in Fig. 15. The said block is preferably secured to the plow beam and to the adjacent bracket for the disk plow by means of the bolt J already described and shown in Fig. 15. Each standard is held in place by one or more bolts $I^3$ provided with a corresponding nut or nuts $i^3$. In practice a single bolt and nut will be sufficient for each standard, and thereby quicker adjustment may be secured for the standard referred to.

The block $I^0$ carrying the rear standard is generally similar to the other block $I^2$ already described, but it is provided with a rearward extension $i^0$ to which the bell crank lever M is pivoted as at $m$. The rear wheel F is journaled on the stub shaft $F'$ carried by the arm $m'$ of this bell crank lever, and to the opposite arm $m^2$ the rear wheel operating rod or pitman $M'$ is pivoted, as shown in Figs. 2 and 6. This rod is bent outward, as at $m^3$, to clear the edge of the rear disk plow and is connected, as at $m^4$, to the cylinder $M^2$, see Figs. 13 and 14. This cylinder is provided with an annular rib having internal screw threads $m^5$ to engage the screw threads $m^6$ of the rod $M^3$, which rod passes through the closed cap $m^7$ of the cylinder $M^2$. The cylinder should be supplied with oil so that the screw operates in an oil bath.

This rod $M^3$ passes through a sleeve $O^3$, whose purpose will be hereinafter described, and is connected by a universal joint $m^8$ to the rod $M^4$ which is rigidly attached to the rod $M^5$, terminating in the hand crank $m^9$. By turning this hand crank the screw $M^3$ will be turned in the nut $m^5$, which will rock the bell crank lever M and raise or lower the rear wheel F. This may be done by the operator of the tractor without necessitating his moving from the seat.

The pitman connecting the bell crank M with the hand crank $m^9$ is bent so as to avoid various parts of the apparatus, and the universal joint $m^8$ is located substantially below the axis of the king bolt L so that the truck frame K may be swung through the requisite angle laterally without interfering in any way with the operation of this pitman, either by hand as just described, or automatically as under the influence of the power lift, as will be hereinafter more fully described.

The road wheel may be either lifted or lowered by hand or automatically, and for clearness of description the hand operation will first be described.

N represents a rod whose front end, like the front end of the rod $M^5$, is journaled in the plate $c^2$ carried by the tongue $C'$. This rod N carries at its forward end the hand crank $n$, and at its rear end it is connected to the coupling sleeve $N'$ which is connected by a universal joint $n^2$, see Figs. 4, 7 and 9, which sleeve $N'$ is connected to the rod $N^2$ which passes through the sleeve $Q^3$, which effects the automatic operation, as will be hereinafter more fully described.

This rod $N^2$ projects into the closed cylinder $N^3$, and is provided at its rear end with screw threads $n^4$ engaging the screw threads $n^3$ formed on the inside of the cylinder, as shown most clearly in Fig. 9. This cylinder is supplied with oil so that the screw $n^4$ operates in an oil bath.

The cylinder $N^3$ is provided with a trunnion $n^5$ engaging the bearing $o$ at the end of the crank arm O, which arm is fast to the transverse shaft $O'$, see Figs. 3, 7 and 8, and this shaft $O'$ has a downwardly projecting crank arm P, which is provided with a bearing $P'$ in which the stub shaft $E'$ is journaled. This stub shaft is splined to the hub $e$ of the road wheel E, and the stub shaft turns with the road wheel.

It will be obvious that if the arm P, which is fast to the shaft $O'$, is rocked that the road wheel E will be raised or lowered relative to the truck frame, or what amounts to the same thing the truck frame and main frame will be lowered or raised dependent upon the rocking movement of the crank arm P. It will be seen that by rotating the hand crank $n$ the screw $N^2$ is rotated, which causes the cylinder $N^3$ to rock the crank arm O and with it the shaft $O'$ and the crank arm P, thus raising or lowering the road wheel.

It will be seen that either the rear wheel F or the road wheel E may be raised or lowered relative to the main frame by operating the corresponding screws $M^3$ and $N^2$ respectively, and this without in any way affecting the automatic lift mechanism which will be hereinafter described.

Q represents a transverse shaft journaled, like the shaft O', in the truck frame K, and this shaft Q has a downwardly depending arm Q' to which the stub shaft D' is attached, on which stub shaft the hub $d$ of the furrow wheel D is journaled. It will be seen that rocking the shaft Q will raise or lower the furrow wheel D relative to the main frame, and this is accomplished automatically by the power lift, as will be hereinafter described.

It will be noted in Fig. 2 that the furrow wheel when in the lower position, corresponding to the lifting of the plow attachment out of engagement with the ground, is set at an angle forward, with the tendency to swing forward and permit the plows to be lowered. This tendency is in part compensated for by the stout coil spring $D^0$, which tends to provide a yielding support for the furrow wheel and also to assist the power action when the automatic lift is operated.

The control of the automatic operation of the power lift will now be described.

In addition to the crank arm O the shaft O' carries a second arm $O^2$, see Figs. 3, 13 and 14, which arm has a bearing at its lower end to engage the trunnion $o^3$ fast to the sleeve $O^3$, which sleeve is slidably mounted on the screw $M^3$, but is adapted to bring up against the collar $m^9$ on the screw $M^3$ as shown in Fig. 14. Thus when the shaft $O'$ is rocked in a clockwise direction from the position shown in Fig. 13 the arm $O^2$ will pull on the rod M' and will lift the rear wheel F.

In a similar way the shaft Q, in addition to the arm Q' to which the furrow wheel is journaled, carries a second arm $Q^2$, see Figs. 7 and 9, which has a journal bearing at its lower end for the trunnion $q^3$ of the sleeve $Q^3$, which sleeve is slidably mounted on the screw $N^2$, but brings up against the collar $n^9$ on the said screw, as shown in Fig. 9. This screw $N^2$ is free to slide in one direction through the sleeve $Q^3$, but is prevented from sliding in the other direction by the set collar $n^9$, and consequently the screw $N^2$ may be drawn by hand through this sleeve $Q^3$ in one direction as in operating by hand, but cannot be moved in the opposite direction without rocking the arm $Q^2$.

The automatic operation of the power lift is controlled by the operating lever R which is located within easy reach of the operator on the tractor. This lever is connected by the rod R' to the lever $R^2$, which is pivoted as at $r$ on the crank P, in which the road wheel shaft E' is journaled. This lever $R^2$ is connected by the link $R^4$ to the opposite lever $R^3$, which is also pivoted as at $r'$ on the crank P, and the two levers $R^2$ and $R^3$ are provided with inwardly projecting lugs $r^2$ and $r^3$, respectively, see Figs. 2, 8, 10 and 11.

The crank P is provided with a cylindrical housing $P^0$ having slots $p^2$ and $p^3$, registering, respectively, with the lugs $r^2$ and $r^3$ of the levers $R^2$ and $R^3$.

The shaft E' is reduced, as at $E^2$, and projects through the center of the housing $P^0$ and carries a ratchet wheel $E^0$. The cap W is loosely mounted on the reduced portion $E^2$ of the shaft, and is held in place by the nut $E^4$ secured on the screw-threaded end $E^3$ of said shaft, and the cap W' is mounted over the end $E^4$ and is screwed on the boss of the cap W. This cap W is provided with a lug $w$, having the pin $w'$ connected by the link X to the truck frame K, as shown most clearly in Figs. 3, 4 and 12.

The yoke T is slidably mounted in the housing $P^0$, and is provided with a central opening $T^0$, see Figs. 11 and 12, which central opening incloses the ratchet wheel $E^0$.

The operation of the automatic power lift is very similar to that illustrated and described in my Patent No. 1,323,887 of May 20, 1919, already referred to.

The yoke T is preferably made of two plates T' and $T^2$ fastened together with bolts, and each provided with oppositely disposed lugs $t^2$ and $t^3$ which are slidably held between the lugs $w^2$ and $w^3$ projecting inward from the cap W. Mounted between these plates is the pawl $t$ having its stem $t'$ securely bolted between the plates, as shown most clearly in Fig. 12. This pawl is normally held out of engagement with the ratchet wheel by means of the springs U' attached to the cross head U, held between the plates T' and $T^2$, and these springs also tend to snap the lug $t^2$ into engagement with the corresponding slot $p^2$ in the wall of the housing $P^0$.

It will be noted that when this lug $t^2$ is in engagement with the slot $p^2$, as shown in Fig. 10, the lugs $w^2$, and consequently the cap W, will be held against turning in the housing $P^0$. When this lug $t^2$ is pressed inward, which is accomplished by pulling on the lever R and causing the lug $r^2$ to press against the lug $t^2$, the yoke T, and with it the cap W, will be free to rotate in the housing $P^0$. At this time the springs U' will be held in the stretched position shown in Fig. 11. When the yoke T is pressed inward the pawl $t$ will engage the ratchet wheel $E^0$, and if the road wheel is in motion it will rotate the cap W through an angle, causing the yoke T to assume the position reached in Fig. 11, which indicates the limit of travel of the cap.

Now if the lever R is released, the springs U' will cause the lug $t^2$ to bear against the lug $r^3$ on the lever $R^3$, which moves simultaneously with the lever $R^2$, and the springs U' will restore the levers $R^3$, $R^2$ and R to the initial position, at which time the shaft $E^0$ will be in the raised position, and correspondingly the main frame of the implement will be in the lowered position and the road wheel will be free to rotate.

Now if it is desired to lift the main frame, pull on the lever R which will cause the lug $r^3$ to press in the lug $t^2$, as shown in Fig. 11. This will cause the pawl $t$ to engage in the ratchet wheel $E^0$ and the road wheel will be locked to the cap W, and the turning of this cap will cause the link X to push the crank P back to the position shown in Figs. 7 and 10, the road wheel is lowered, and consequently the main frame of the implement is raised, lifting the disk plows and subsoilers out of the soil.

It will be seen that the rotation of the shaft O', under the action of the power lift mechanism just described, will not only tend to raise or lower the road wheel E, but will also simultaneously raise or lower the furrow wheel D and the rear wheel F; if the angular motion of this shaft O' rocks the arm O, see Figs. 2, 3, 7 and 9, which causes the parts $N^3$ and $N^2$ to pull on the sleeve $Q^3$ and rock the arm $Q^2$, thus raising or lowering the furrow wheel. The same motion of the shaft O' will cause the arm $O^2$ to pull on the sleeve $O^3$, which will cause the rod $M^3$, sleeve $M^2$ and rod M' to rock the bell crank lever M and raise or lower the rear wheel F.

Thus it will be seen that if the main frame is in the raised position shown in Fig. 2 a simple pulling on the lever R will cause the power lift to lower the main frame by raising all of the wheels relative to said frame. If the frame is in the lowered position pulling on the lever R will cause the power lift to force the wheels downward, thus lifting the frame and withdrawing the disk plows and subsoilers from the soil. This automatic action of the power lift is effected for alternately raising or lowering the main frame by a simple pull on the operating lever R and releasing said lever, when the automatic mechanism will do the rest.

It will be noted that the rear wheel is not free to swing laterally, but the guiding and turning of the machine is effected by rotating the front truck about the king bolt L. The truck frame K is of any suitable reinforced construction, and is preferably provided with a top bearing plate K', which bears against the plate B' of the main frame. This truck frame is tied down to the main frame by means of a saddle plate Y and bolts L and Z; spacing washers $y$ and $y'$ being provided on said bolts so that the plate K' can be turned freely through the desired angle beneath the plate B', as shown in Fig. 13. By preventing the rear wheel from swinging laterally the rear end of the plow is held in direct alinement on hillsides, securing uniform width of furrow either in plowing uphill or downhill. When the rear wheel had a lateral swing, there was found to be a tendency of the rear end of the plow to slip downhill, producing irregular widths of furrows.

The operation of the device is as follows:—

Suppose the parts to be in the position shown in Fig. 2, with the subsoilers clear of the ground, the operator backs the tractor up and couples it onto the implement and drags the same to the field where the implement is to be operated. Before starting to plow the operator pulls the lever R, causing the road wheel to operate the automatic lift to lift all three wheels, or, what amounts to the same thing, allows the main frame carrying the plows and subsoilers to drop by gravity to the operative position. After beginning the plowing if it is found that the plows are not cutting deep enough, the depth of the furrows may be increased by turning the hand cranks $n$ and $m^0$, which are also in convenient reach of the seat. If it is found that the plows are plowing too deep, the depth may be decreased by turning the same cranks in the opposite direction.

If an obstruction is seen, such as a stone or stump, or ditch, the plow may be lifted over these obstructions by pulling on the power lift lever R which automatically lifts the plow over the obstruction. If the plow encounters some hidden obstruction, the tractor may be reversed and the plow pushed backward a few feet after which the power lift lever is pulled again and the tractor is started; the automatic power lift lifts the plow over the obstruction after which another pull on the same power lift lever automatically drops the plow back in the plowing position.

When the end of the furrow is reached, the power lift lever is again pulled, thereby automatically lifting the plow out of the ground while the implement is being turned.

The foregoing depth adjustment applies to the plow frame as a whole, and there is a separate adjustment for the subsoilers. The subsoilers preferably project at a more or less depth below the bottom of the corresponding disks and their standards may be adjusted by taking the nut off the bolt $I^0$ and removing the bolt and raising or lowering the standard to the desired position. If it is found that the front disk and subsoiler are cutting deeper than the rear disk and subsoiler, this may be corrected by turning the hand crank $m^0$ and raising or lowering the rear wheel F.

In doing shallow plowing and covering trash, the scrapers must be lowered to a point against the surface of the corresponding disks because the disks do not dig deep enough into the ground for the scrapers to engage the dirt and cover the trash. The scraper serves as a mold board for the disk and covers the trash. It also serves to pulverize the dirt turned up by the disk. Besides the simple function of scraping off the dirt, the scrapers have the important function of turning over the earth which is turned up by the disks, and also pulverizing it in so doing. If it is desired to plow deeper with the disks, the scrapers should be raised so that they will always act above the normal level of the ground, thus preventing choking or clogging.

The disks may be readily adjusted both in the vertical and horizontal planes by means of the attachments shown in Figs. 17 to 25, as hereinbefore fully described.

The plow beams may be quickly and conveniently assembled by the nut and bolt arrangements shown.

It will be noted that the heavy coil spring $D^0$ tends to draw the furrow wheel to the lifting position and so lessens the power required to operate the screws in lifting the frame.

The weight of the main frame and the parts carried thereby will tend to facilitate the lowering of the parts whether operated by hand or by the power lift.

In order to facilitate the operation of the hand lever R a coil spring under compression is provided at the forward end of the rod R', as shown at S in Figs. 2 and 4, so that when the lever is thrown if the pawl $t$ does not catch at once in the ratchet wheel the spring would throw it into engagement when the ratchet wheel is turned to the proper position. It will be noted that all of the parts for operating the device are within easy reach of the operator of the tractor, and that a single man can operate the implement.

It will be noted on an inspection of Fig. 1 that none of the parts of the implement reaches up as high at the top of the tractor, and the implement may be operated in orchards or under trees having low branches without any danger of the operation of the device being affected by striking such branches.

I have illustrated and described an attachment provided with three plows and corresponding scrapers and three subsoilers, and this is a convenient implement to be drawn by the ordinary farm tractor under normal conditions; but if desired the number of plow beams carrying the corresponding scrapers and subsoilers may be increased or decreased and yet come within the scope of my invention.

Furthermore, if it is desired the subsoiler attachment may be omitted either temporarily or permanently, leaving the disk plows to operate alone.

It will be obvious that various modifications might be made in the herein described apparatus, and in the construction, combination and arrangement of parts which could be used without departing from the spirit of my invention, and I do not mean to limit the invention to such details except as particularly pointed out in the claims.

Having thus described my invention what I claim and desire to secure by Letters Patent of the United States is:—

1. Apparatus of the character described, comprising a main frame, a rear wheel pivoted thereto, plows carried by said main frame, a truck frame pivoted to and supporting said main frame near its forward end, a road wheel and a furrow wheel journaled beneath and supporting said truck frame and thereby supporting the forward end of said main frame, screws operable from the front end of the truck frame for raising and lowering by hand said rear wheel and said road wheel, means for simultaneously raising and lowering all three of said wheels relative to said main frame, and means operable from the front end of said truck frame for throwing said first mentioned means into and out of operation when desired.

2. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, a pitman connected to said bell crank lever and operable from the front end of the truck frame for rocking said bell crank lever, thereby raising and lowering by hand said rear wheel, and a second screw and mechanism operated thereby, also operable from the front end of said truck frame for raising and lowering said road wheel.

3. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, a pitman connected to said bell crank lever and operable from the front end of the truck frame for rocking said bell crank lever, thereby raising and lowering by hand said rear wheel, and a second screw and mechanism operated thereby, also operable from the front end of said truck frame for raising and lowering said road wheel, with means for simultaneously raising and lowering all three of said wheels relative to said main frame, and means operable from the front end of said truck frame for throwing said first mentioned means into and out of operation when desired.

4. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, a pitman connected to said bell crank lever and operable from the front end of the truck frame for rocking said bell crank lever, thereby raising and lowering by hand said rear wheel, said pitman being provided with a universal joint located below and near the pivot center of said truck frame, with a screw in rear of said joint, and a cylinder forming part of said pitman provided with a nut on its interior engaging said screw.

5. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, a pitman connected to said bell crank lever and operable from the front end of the truck frame for rocking said bell crank lever, thereby raising and lowering by hand said rear wheel, said pitman being provided with a universal joint located below and near the pivot center of said truck frame, with a screw in rear of said joint, and a cylinder forming part of said pitman provided with a nut on its interior engaging said screw, and a second screw and mechanism operated thereby, also operable from the front end of said truck frame for raising and lowering said road wheel.

6. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, a pitman connected to said bell crank lever and operable from the front end of the truck frame for rocking said bell crank lever, thereby raising and lowering by hand said rear wheel, said pitman being provided with a universal joint located below and near the pivot center of said truck frame, with a screw in rear of said joint, a cylinder forming part of said pitman provided with a nut on its interior engaging said screw, and a second screw and mechanism operated thereby, also operable from the front end of said truck frame for raising and lowering said road wheel, with means for simultaneously raising and lowering all three of said wheels relative to said main frame, and means operable from the front end of said truck frame for throwing said first mentioned means into and out of operation when desired.

7. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward ends, a road wheel and a furrow wheel journaled beneath and supporting said truck frame, a pitman connected to the said bell crank lever and provided with a hand crank operable from the front end of the trunk frame for rocking said bell crank lever, thereby raising and lowering by hand said rear wheel, said pitman being provided with a universal joint located below and near the pivot center of said truck frame, with a screw in rear of said joint, and a closed cylinder adapted to contain oil forming part of said pitman provided with a nut on its interior engaging said screw.

8. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame, a pitman connected to said bell crank lever and provided with a hand crank operable from the front end of the truck frame for rocking said bell crank lever, thereby raising and lowering by hand said rear wheel, said pitman being provided with a universal joint located below and near the pivot center of said truck frame, with a screw in rear of said joint, a closed cylinder adapted to contain oil forming part of said pitman provided with a nut on its interior engaging said screw, and a second screw and closed cylinder and mechanism operated thereby, with a hand crank operable from the front end of said truck frame for raising and lowering said road wheel.

9. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame, a pitman connected to said bell crank lever and provided with a hand crank operable from the front end of the truck frame for rocking said bell crank lever, thereby raising and lowering by hand said rear wheel, said pitman being provided with a universal joint located below and near the pivot center of said truck frame, with a screw in rear of said joint, a cylinder forming part of said pitman provided with a nut on its interior engaging said screw, a second screw with its closed cylinder and mechanism operated thereby, with a second hand crank also operable from the front end of said truck frame, for raising and lowering said road wheel, and means for simultaneously raising and lowering all three of said wheels relative to said main frame, and means operable from the front end of said truck frame for throwing said first mentioned means into and out of operation when desired.

10. Apparatus of the character described, comprising a main frame, a bell crank lever pivoted to the rear end of said main frame, a rear wheel journaled to one arm of said lever, plows carried by said main frame, a truck frame pivoted to and supporting said main frame near its forward end, a road wheel and a furrow wheel journaled beneath and supporting said truck frame and the forward end of said main frame, and a bent pitman connected to said bell crank lever and terminating at its front end in a hand crank operable from the front end of the truck frame for rocking said bell crank lever, thereby raising and lowering by hand said rear wheel.

11. Apparatus of the character described, comprising a main frame, a bell crank lever pivoted to the rear end of said main frame, a rear wheel journaled to one arm of said lever, plows carried by said main frame near its forward end, a road wheel and a furrow wheel journaled beneath and supporting said truck frame and the forward end of said main frame, a bent pitman connected to said bell crank lever and terminating at its front end in a hand crank operable from the front end of the truck frame for rocking said bell crank lever, thereby raising and lowering said rear wheel, with means for simultaneously raising and lowering all three of said wheels relative to said main frame, and means operable from the front end of said truck frame for throwing said first mentioned means into and out of operation when desired.

12. Apparatus of the character described, comprising a main frame, a rear wheel pivoted thereto, plows carried by said main frame, a truck frame pivoted to and supporting said main frame near its forward end, a road wheel and a furrow wheel journaled beneath and supporting said truck frame and thereby supporting the forward end of said main frame, a coil spring under tension normally drawing said furrow wheel to the lowered position, screws operable from the front end of the truck frame for raising and lowering by hand said rear wheel and said road wheel, mechanism for simultaneously raising and lowering all three of said wheels relative to said main frame, a lever operable from the front end of said truck frame, and means controlled by said lever for throwing said mechanism into and out of operation when desired.

AUGUSTA POSTELLE McKAY.